United States Patent [19]
Albers et al.

[11] Patent Number: 6,097,798
[45] Date of Patent: Aug. 1, 2000

[54] ELECTRONIC SURVEILLANCE IN A PUBLIC SWITCHED TELEPHONE NETWORK

[75] Inventors: Raymond F. Albers, Vienna; Charles H. Eppert, III, Fairfax, both of Va.; Barry P. Pershan, Olney; Daniel C. Michaelis, Ellicott City, both of Md.; Michael G. Pilkerton, Fairfax; Robert D. Farris, Sterling, both of Va.; Christine W. Huff, Vienna, Va.

[73] Assignee: Bell Atlantic Network Services, Inc., Arlington, Va.

[21] Appl. No.: 09/112,154

[22] Filed: Jul. 9, 1998

[51] Int. Cl.[7] .................................................. H04M 15/00
[52] U.S. Cl. ................................. 379/114; 379/7; 379/35
[58] Field of Search ................................... 379/1, 2, 6, 7, 379/32–35, 219–221, 229–230, 201, 265–266, 309, 27–29, 111–114, 120–121, 127, 133–134

[56] References Cited

U.S. PATENT DOCUMENTS

| | | |
|---|---|---|
| 5,012,511 | 4/1991 | Hanle et al. . |
| 5,241,588 | 8/1993 | Babson, III et al. . |
| 5,247,571 | 9/1993 | Kay et al. . |
| 5,471,519 | 11/1995 | Howe et al. ............................... 379/67 |
| 5,475,732 | 12/1995 | Pester, III . |
| 5,572,583 | 11/1996 | Wheeler, Jr., et al. . |
| 5,590,171 | 12/1996 | Howe et al. ............................... 379/33 |
| 5,592,530 | 1/1997 | Brockman et al. . |
| 5,809,120 | 9/1998 | Montgomery et al. ................... 379/113 |
| 5,881,132 | 3/1999 | O'Brien et al. ............................ 379/35 |

OTHER PUBLICATIONS

Federal Communications Commission. "First Report and Order and Further Notice of Proposed Rulemaking in the Matter of Telephone Number Portability," pp. 1–118, Appendices A–F (Jul. 2, 1996) & Erratum released Jul. 17, 1996.

Telecommunications Industry Association. "Lawfully Authorized Electronic Surveillance (Baseline Revision 10), " TR45.2, Subcommittee PN–3580 (Dec. 11, 1996).

Bell Atlantic Corporation. "Bell Atlantic Makes History by Providing Local Number Portability to Competitors in New York," pp.1–3 (May 28, 1998).

Siemens Telecom Networks. "Acronym Guide: Siemens Telecom Networks: Local Number Portability," p.1 (Apr. 2, 1998).

Siemens Telecom Networks. "Topic 7: Siemens Telecom Networks: Local Number Portability: Managing the Regional Databases," p.1 (Apr. 2, 1998).

Siemens Telecom Networks. "Topic 11: Siemens Telecom Networks: Local Number Portability: How is a Telephone Number Ported?", pp.1–2 (Apr. 2, 1998).

(List continued on next page.)

*Primary Examiner*—Curtis A. Kuntz
*Assistant Examiner*—Duc Nguyen
*Attorney, Agent, or Firm*—McDermott, Will & Emery

[57] ABSTRACT

Telephone network surveillance is provided for targeting subscriber terminals that receive service through an office lacking a switch with surveillance capability. A foreign exchange line is relied upon to connect the target's line to an office having that capability. Advanced Intelligent Network (AIN) functionality controls routing and billing of incoming and outgoing calls, so that the telephone network operations appear completely normal during the surveillance. In the office normally serving the target's line, a terminating attempt trigger causes that office to obtain instructions from a service control point (SCP), to route the call to the foreign exchange line terminated in the office with the surveillance capability. The instructions also prevent billing of the redirection through the surveillance office to either the called party or the calling party. An off-hook delay trigger set against the foreign exchange line in the surveillance office causes that office to obtain instructions from the SCP, to facilitate billing for the call as if initiated from the target's normal telephone line connection.

36 Claims, 2 Drawing Sheets

OTHER PUBLICATIONS

Siemens Telecom Networks. "Topic 1: Siemens Networks: Local Number Portability: Introduction," pp. 1–3 (Apr. 2, 1998).

Siemens Telecom Networks. "Topic 4: Siemens Telecom Networks: Local Number Portablility: Number Administration and Call Routing in Today's Network," p.1 (Apr. 2, 1998).

USTA, "Local Number Portability (LNP): Overview of LNP," p.1 (Apr. 2, 1998).

Siemens Telecom Networks. "Topic 5: Siemens Telecom Networks: Local Number Portability: Tomorrow's Network — the Location Routing–Number Architecture," pp.1–4 (Apr. 2, 1998).

"Number Portability News and Links," pp.1–7 (May 28, 1998).

Lucent Technologies. "Number Portability Technical Documents," pp. 1–2 (May 28, 1998).

Nortel. "Number Portability –LNP Background," pp.1–4 (May 28, 1998).

Lucent Technologies. "Local Number Portability," pp.1–2 (May 28, 1998).

Ovum. "Number Portability: Strategies for Market, Technical and Regulatory Success," pp.1–3 (May 28, 1998).

"Midwest Region: Primer for Local Number Portability," Issue 2, pp.1–31 (May 28, 1998).

Nortel. "Local Number Portability: LNP Backgrounder," pp.1–4 (May 28, 1998).

ELECTRONIC SURVEILLANCE IN A PUBLIC SWITCHED TELEPHONE NETWORK

CROSS-REFERENCE TO RELATED APPLICATIONS

This application is related to patent application Ser. Nos. 09/112,155, 09/112,160, and 09/112,473, filed simultaneously. Those applications are incorporated by reference herein in their entirety.

TECHNICAL FIELD

The present invention relates to a method and system for providing lawfully authorized electronic surveillance service in a Public Switched Telephone System (PSTN) and more particularly to configuring existing telephone networks using various types of switches to effectively and economically provide such service.

Acronyms

The written description uses a large number of acronyms to refer to various services, messages and system components. Although generally known, use of several of these acronyms is not strictly standardized in the art. For purposes of this discussion, acronyms therefore will be defined as follows:

Address Complete Message (ACM)
Advanced Intelligent Network (AIN)
American National Standards Institute (ANSI)
ANswer Message (ANM)
Automated Message Accounting (AMA)
Automatic Number Identification (ANI)
Call Processing Record (CPR)
Central Office (CO)
Common Channel Signaling (CCS)
Communications for Assistance for Law Enforcement Act (CALEA)
Custom Local Area Signaling Services (CLASS)
Federal Bureau of Investigation (FBI)
Generic Address Parameter (GAP)
Generic Data Interface (GDI)
Initial Address Message (IAM)
Integrated Service Control Point (ISCP)
Integrated Services Digital Network (ISDN)
ISDN User Part (ISUP)
Intelligent Peripheral (IP)
Local Access and Transport Area (LATA)
Local Number Portability (LNP)
Location Routing Number (LRN)
Multi-Services Application Platform (MSAP)
Numbering Plan Area (NPA)
Office Equipment (OE)
Origination Point Code (OPC)
Personal Communications Service (PCS)
Plain Old Telephone Service (POTS)
Point in Call (PIC)
Personal Identification Number (PIN)
Primary Rate Interface (PRI)
Public Switched Telephone Network (PSTN)
Records Accounting Office (RAO)
Record Change Memory Administration Center (RCMAC)
Remote Memory Administration System (RMAS)
Service Control Point (SCP)
Service Creation Environment (SCE)
Service Management System (SMS)
Service Switching Point (SSP)
Signaling System 7 (SS7)
Signaling Point (SP)
Signaling Transfer Point (STP)
Simplified Message Desk Interface (SMDI)
Speaker Identification/Verification (SIV)
Telecommunications Industry Association (TIA)
Terminating Attempt Trigger (TAT)
Time Slot Interchange (TSI)
Traffic Service Position System (TSPS)
Transaction Capabilities Applications Part (TCAP)
Transmission Control Protocol/Internet Protocol (TCP/IP)

BACKGROUND

Historically in the United States authorities such as city, state, or federal police authorities, may engage in electronic surveillance (frequently referred to in the vernacular as wire-tapping), when duly authorized to perform such an activity by a cognizant judicial authority. In earlier times, when public telephone service was virtually all analog the procedure was relatively simple. Assuming surveillance of a residence connected to the telephone network by a local loop consisting of a pair of copper wires, the usual practice was to locate a convenient cross connect and bridge on to the two wire analog circuit. The entity conducting the surveillance then engaged the serving telephone network operator or company to provide a circuit from that location to the law enforcement location. The law enforcement organization could then monitor the conversations, generally referred to as content, as well as the call set up and related signaling. Statistically approximately 90 percent of the authorized surveillance in the United States does not cover content but signaling data. Such events are referred to as Pen register taps.

With the widespread use of digital communication and control signaling, the simplicity and ease of the prior surveillance procedures has largely disappeared. As a result, law enforcement agencies, and cooperating Public Switched Telephone Networks (PSTNs), are forced to cope with a considerably more complex and costly substitute set of procedures. Partially in response to this situation Congress passed Public Law 103–414, the Communications Assistance for Law Enforcement Act (CALEA). The Telecommunications Industry Association (TIA), accredited by the American National Standards Institute (ANSI), was selected by the telecommunications industry to promulgate the industry's CALEA standard. TIA promptly initiated a standards program. Initial disagreements within industry were resolved, and TR45 Lawfully Authorized Electronic Surveillance SP-3580, Baseline Revision 10 was produced. These have become known as the "safe harbor" standards pending resolution of still outstanding differences with respect to certain preferences of the Federal Bureau of Investigation (FBI).

The CALEA specifications include the requisite that the target for surveillance continue to be provided with all subscribed enhanced, CLASS, and other services, and that the surveillance be completely transparent. The central office switches currently in use in the public switched telephone networks were not designed with CALEA functionalities in mind. As a result it is not surprising that not all types of existing switches are readily adapted to operate in a network that meets major CALEA requirements.

The basic surveillance problem has undergone continued evolution as telecommunications technology has advanced and provided the public with an ever-increasing variety of services. Illustrative of such services, which create added complexity for effective telephone surveillance, is call forwarding and particularly remotely activated call forwarding. Another example is central office based speed dialing.

Since the proposed CALEA requirements are worded in terms of service, i.e., monitoring the telephone service (signaling and speech), and anything that can be accomplished with the service, significant problems are presented. This becomes particularly acute when coupled with a desire that the surveillance preferably be near universally applicable to all telephone central offices, including end offices, which rely on legacy switches. One example of a specific problem is encountered with end offices using Lucent (formerly AT&T) 1AESS switches. These switches are among the earlier variety of stored program controlled switches and are rapidly being retired. As a consequence, it would not be wise to expend large sums to develop CALEA feature software for these switches. On the other hand the later Lucent 5ESS switches will be in service for many years to come and it may make sense to develop the requested surveillance capabilities in a number of network configurations. Cost considerations weigh heavily in selecting and providing an acceptable solution.

It is accordingly an object of the present invention to provide a relatively straightforward and cost effective solution to the foregoing problem.

DISCLOSURE OF THE INVENTION

For some years, the telephone industry has been developing an enhanced telephone network, sometimes referred to as an Advanced Intelligent Network (AIN), for providing a wide array of new voice grade telephone service features. In an AIN type system, local and/or toll offices of the public telephone network detect one of a number of call processing events identified as AIN "triggers". An office which detects a trigger will suspend call processing, compile a call data message and forward that message via a common channel signaling (CCS) link to a database system, such as an Integrated Service Control Point (ISCP) which includes a Multi-Services Application Platform (MSAP) database. If needed, the ISCP can instruct the central office to obtain and forward additional information. Once sufficient information about the call has reached the ISCP, the ISCP accesses its stored data tables in the MSAP database to translate the received message data into a call control message and returns the call control message to the office of the network via CCS link. The network offices then use the call control message to complete the particular call.

An AIN type network for providing an Area Wide Centrex service, for example, was disclosed and described in detail in commonly assigned U.S. Pat. No. 5,247,571 to Kay et al., the disclosure of which is entirely incorporated herein by reference.

In an AIN network developed by the Regional Bell Operating Companies (RBOCs) and Bell Communications Research (Bellcore), a terminal and software system referred to as 'SPACE' functions as the service creation environment and/or service provisioning system for the AIN control functions in the Service Control Points (SCPs) and Integrated Service Control Points (ISCPs). For example, as disclosed in U.S. Pat. No. 5,241,588 Babson, III et al., customized call processing information records are created and/or modified in a graphical environment, by creating or modifying a customer's service graph on the display terminal. Data corresponding to the service graph is then stored in the SCP. Other terminal and software systems could be used to create and provision the AIN services. For AIN services today, however, telephone company personnel widely utilize the SPACE system to create templates for the service logic for new services. When customers subscribe to the services, the templates are filled in with the subscribers' data to create individual call processing records (CPRs). The CPRs are stored in a database in the ISCP, for controlling actual call processing.

Many of the enhanced communication services offered by the AIN control system permit a subscriber to input control information, to manage services as desired. For example, in a simple call forwarding or redirection service, the subscriber may activate or deactivate the forwarding feature and may change the 'forward to' number from time to time to route calls to different destinations.

Typically such a call forwarding service may be activated by subscribers dialing an activation code followed by a local or toll telephone or directory number (DN). Thereafter, until the subscriber dials a de-activation code, the switching system forwards all of the subscriber's calls to the thus entered forwarding directory number. In effectuating this service a party served by a local SSP switch office and who subscribes to call forwarding service has stored in the memory at the office, data identifying the party as a subscriber. In addition data is also stored at the office indicating if the service is activated and, if so, a directory number to which incoming calls are to be forwarded. When an incoming call is received the stored program of the office directs the interrogation of the memory data associated with the called station to determine if the called party subscribes to call forwarding service. If not, or if the service is not activated, the call is completed to the called station in ordinary fashion. However if a call forwarding service is active for the called party the stored program obtains the forwarding number from memory and from that point acts effectively as an originating office with respect to the new number. That is, the office may complete the call locally to the new number if it is served by the office, or it may seize an outgoing trunk to another local office or to a toll network, as the situation demands, and outpulse the new number to a distant office to complete the call.

With standard call forwarding, programming is accomplished either from the subscriber's primary DN or manually by a technician at the Record Change Memory Administration Center (RCMAC), using the Remote Memory Administration System (RMAS). Conventional Call Forwarding provides an access code and a series of prompts to guide the customer through the call forwarding programming sequence. Recently there has been implemented a new feature which may be referred to as Remote Access to Call Forwarding (RACF). With Remote Access to call forwarding a subscriber can utilize any telephone equipped with DTMF signaling capability, dial a special access number, followed by a Personal Identification Number (PIN), and then dial additional codes in order to activate or deactivate the call forwarding feature.

An improved version of a system for providing such call forwarding is described in commonly assigned Hanle et al U.S. Pat. No. 5,012,511, issued Apr. 30, 1991, titled Method of and System for Control of Special Services by Remote Access. That patent is incorporated by reference herein in its entirety. One version of the system described in the Hanle et al. patent for remotely programming switches, uses multiplexing of processed recent change signals delivered to the switch. This particular version of the Hanle et al system provides very prompt, approaching virtually real time, effectuation of call forwarding instructions. In this procedure the instructions pass through and are stored in a node which may be located in a multi-services application platform (MSAP).

In a public switched telephone network, interoffice call attempts to or from a line under surveillance generate a variety of query, response and release messages between the offices, as part of the normal procedures for setting up and tearing down the calls to and from the line. According to one feature of the invention means are provided to insure that all calls to or from a line under surveillance generate signaling messages. This is accomplished according to one embodiment of the invention by setting terminating, dialing, and release triggers with respect to the target line, as well as any lines that may become associated with the target line. As a result, the end office serving the target, which may or may not be the end office to which the target's local loop line is attached, sends queries to a database on the signaling network, receives response messages, and sends release report messages, even for intraoffice calls. These messages include all of the call set-up and tear down messages, as well as the query, response and release report messages communicated between the office and the database.

A site processor, acting as a data filter, compiles data from all of the signaling messages relating to each individual call, to or from an identified telephone number or line (the target). The site processor forms a call detail record (CDR) for each call attempt relating to an identified target under surveillance. Site processors associated with multiple switches involved in surveillance activities may upload CDRs to a central file server for parsing, sorting and further processing. The server supplies composite data regarding calls to and from targets under surveillance through a data network connection to processors of one or more law enforcement agencies. The activities involved are transparent to the called and calling parties.

Caller ID signals reflect the target line despite the fact that such would not typically occur with conventional PSTN network architecture and procedures which may be utilized. Likewise billing is controlled to insure that no detail in those procedures indicates that anything but normal telephone service is involved. With respect to call forwarding, signaling information relating to installation of the service, activation and de-activation, and the identification of the forwarding number or numbers are collected at multiple nodes in the system. The necessary information to conduct surveillance on forwarded calls is then derived or forwarded from the appropriate node or nodes in order that the surveillance may be complete.

BRIEF DESCRIPTION OF DRAWINGS

The drawing figures depict the present invention by way of example, not by way of limitations. In the figures, like reference numerals refer to the same or similar elements.

BEST MODE FOR CARRYING OUT THE INVENTION

Figure 1:
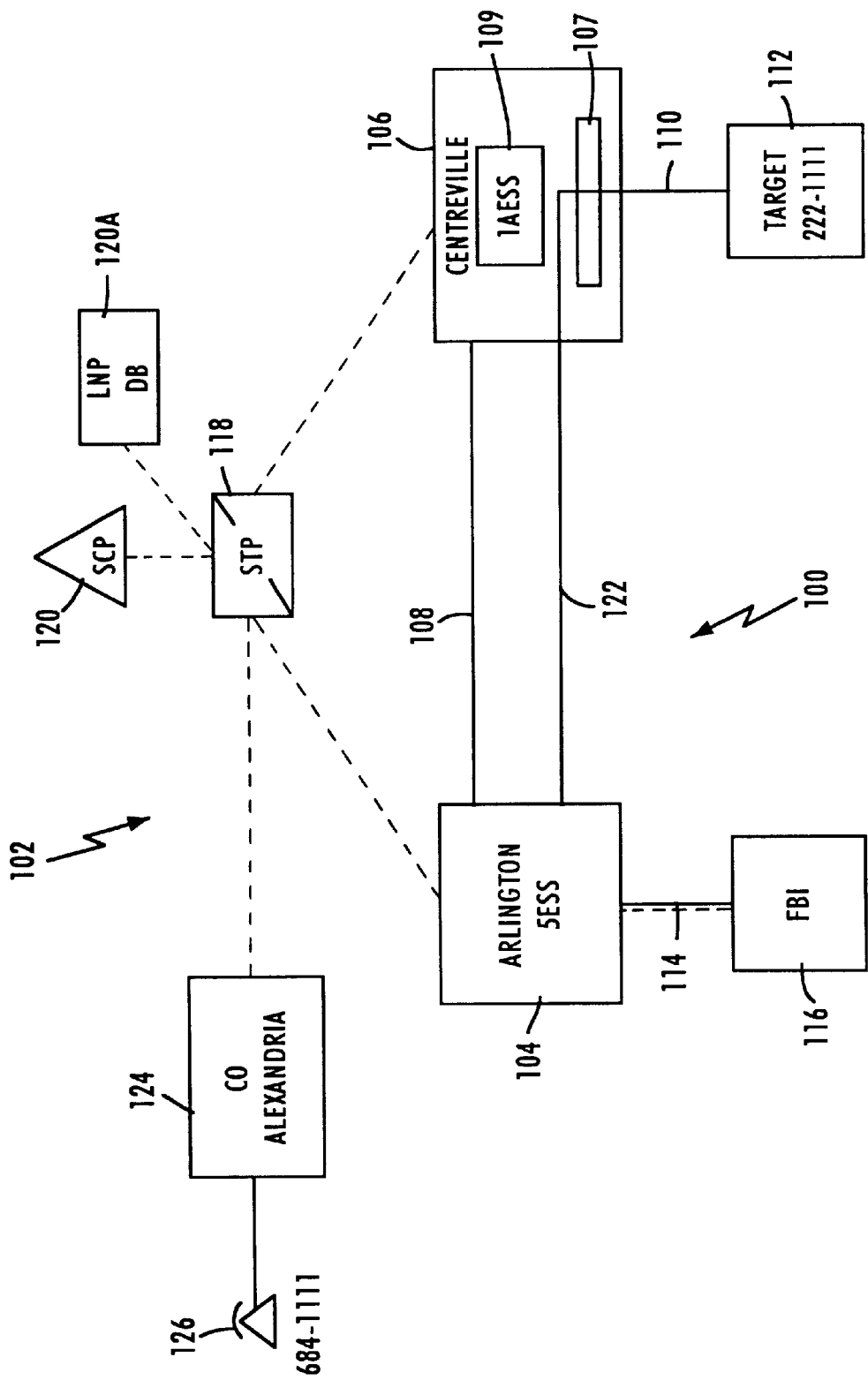
FIG. 1 is a diagrammatic illustration of a public switched telephone network showing its relation to an SS7 common channel signaling network according to one embodiment of the invention.

Referring to FIG. 1 there is shown one preferred embodiment of a Public Switched Telephone Network (PSTN) arranged in an architecture adapted to being operated to implement one or more preferred methods of the invention. Referring to that figure, there is shown in diagrammatic form a Public Switched Telephone Network (PSTN) 100 having an Advanced Intelligent Network (AIN) common channel signaling (CCS) system 102. The PSTN 100 includes an end office (EO) or central office (CO) switching system 104. The switching system 104 is assumed to be a Lucent 5ESS switch for purposes of this example. A second end office switching system is shown at 106, and this switch is assumed to be a Lucent 1AESS switch. The 1AESS switch is not subject to ready modification to implement CALEA features when used in this embodiment of the invention. The end offices 104 and 106 are connected by a trunk or trunk group 108.

These end offices 104 and 106 are located in the same LATA but are geographically spaced. The end office 106, containing the 1AESS switch, is connected by a local loop 110 to the residence 112. The residence 112 has Plain Old Telephone Service (POTS) and is assumed to be occupied by a target of surveillance (target). The end office 104, served by the 5ESS switch, is connected by a voice and data link 114, preferably an ISDN PRI link, to customer premises 116. The customer premises 116 is assumed to be occupied by the enforcement authority having the surveillance authorization, here indicated as the FBI by way of illustration. The ISDN voice and data link 114 is preferably dedicated.

The common channel signaling (CCS) advanced intelligent network (AIN), is represented by the signal transfer point (STP) 118 and service control point (SCP) 120, which may be an Integrated Services Control Point (ISCP). All of the switching offices depicted are assumed to be service switching point (SSP) capable. The STP is linked to the two end offices 104 and 106 by data links shown by broken lines. Likewise the STP is shown linked to the SCP by a data link shown as a broken line.

In order to accomplish the purposes of the invention according to this embodiment, CALEA capabilities are first established in the office 104, which contains the more feature rich 5ESS switch. To this end the 5ESS switch is provided with a CALEA module which comprises a processor and processor program and data store. The CALEA module is in two way data communication and one way voice communication with the administrative module of the 5ESS switch as is later described in detail with respect to FIG. 2.

A foreign exchange (FX) trunk 122 is provided between the 5ESS and 1AESS end offices 104 and 106. Foreign exchange (FX) service provides a customer with telephone service from a distant exchange that is outside (foreign to) the exchange area in which the customer resides. Using existing technology, the telephone carrier establishes a telephone line circuit running from the foreign exchange, here the 5ESS exchange 104, to the customer's premises. For convenience of installation, this circuit typically runs from the foreign exchange to the central office facility that normally would serve the customer's location, in this instance, the 1AESS end office 106. However, the foreign exchange line 122 is cross-connected to form a hard-wired line through that 1AESS office to the twisted wire pair line going to the target customer's premises. The connection in the 1AESS office 106 is made at the main distribution frame 107 of that office. The local Centreville central office 106 and its 1AESS switch 109 do not actually process or switch communications on the foreign exchange line.

In operation, the customer picks up the handset at premises 112. This handset is direct connected to the foreign exchange line 122 at the frame 107, and receives dial tone from the Arlington 5ESS foreign exchange 104. The target customer dials destination digits; the Arlington exchange receives the digits and routes the call. As will be described in detail, the Arlington 5ESS switch is provided with CALEA capabilities and serves as a CALEA switch for the region. In the conventional operation of a foreign exchange, such a foreign exchange call would be billed based on rate calculations for calls originating from the Arlington exchange. Also, the Centreville customer would be separately billed a flat monthly fee for the line connection from the foreign exchange to the customer's premises, typically based on the length of the foreign exchange line. That type of billing is not utilized for the purposes of this embodiment of the invention, as is presently described in detail.

In conventional operation of a foreign exchange line, a party calling a foreign exchange line customer would dial a number assigned to that customer for the foreign exchange line. The number would be associated with the Arlington or foreign exchange NXX. Calls would come through the network to that exchange in the normal manner, and the exchange would connect the calls to the foreign exchange line 122. To the callers, the dialed number and the attendant billing would appear as if the customer resided in the service area of the Arlington exchange. Such is not the case according to the operation of this embodiment of the invention.

According to this embodiment of the invention, dial tone to the target 112 is returned from the 5ESS Arlington office 104. The FX trunk 122 provides a copper connection or a physical hotwire from the main distribution frame 107 of the Centreville office to a line appearance at the main distribution frame of the 5ESS Arlington switch, where it preferably has an office equipment (OE) number designation. For purposes of description it is assumed that the directory number of the target terminal at premises 112 is 703-222-1111, and that the target premises and the 1AESS central office 106, are located in Centreville, Va. It is also assumed that the 5ESS switch central office 104 and the enforcement authority 116 are both located in Arlington, Va.

According to this embodiment of the invention, all of the central offices in this LATA have either a Local Number Portability (LNP) or a 3/6/10 Specific Digit String (SDS) trigger set against the Centreville NPA/NXX 703-222. According to the invention both the SCP 120 database and the LNP database 120A have established therein a table which contains a translation of the target number from 703-222-1111 to a local routing number (LRN), which may be 875-1111, by way of illustrative example. Thus this embodiment of the invention comprehends either an LNP database and trigger or an AIN (SCP) database and SDS trigger. Other than the identity of the database the system would operate sustantially the same using LNP and/or AIN. In addition to the at least one of these triggers, a terminating attempt trigger (TAT) is set in the 5ESS office 104. This office may serve as the CALEA implementation office for non-CALEA capable switches in this LATA or within a designated area in this LATA.

The operation for incoming calls to the target is best illustrated by a concrete example. For this purpose there is shown in FIG. 1 an additional end office 124 which is illustratively located in Alexandria, Va. The end office 124 serves an Alexandria subscriber having a terminal 126, which may have a directory number of 703-684-1111. Pursuant to the AIN solution, when the Alexandria subscriber uses terminal 126 to go off-hook and dial the number of the target 703-222-1111, the 3/6/10 trigger which is set in all end offices in the LATA, including the Alexandria office 124, suspends processing and launches a query to the SCP 120 via STP 118. Pursuant to the LNP solution an LNP trigger is used and the LNP database is queried.

According to the AIN solution, the SCP database consults its table against the number 703-222-1111 and determines the associated Local Routing Number (LRN) 703-875-1111. The SCP thereupon frames a TCAP response to the query and instructs the Alexandria switch 124 to set up a route for that 703-875-1111 call in the same manner as it would for any other 875 or local portability number. The Alexandria switch 124 then regenerates the original call to the Arlington switch 104, sending along the 703-222-1111 directory number of the target in the GAP field of the signaling message. The SSP recognizes the LRN. The original called number is pulled from the Generic Address Parameter (GAP) and placed in the called party ID field.

Pursuant to the incoming signaling message, the CALEA module and regime or software searches its table of target directory numbers and confirms that the 222-1111 number of the target 112 is to receive surveillance processing. The Arlington switch 104 now will perform all of the routines required by the CALEA specification, which is in the software of the CALEA module of the 5ESS switch, which is presently described in further detail. Further, at this point the call encounters a terminating attempt trigger in the Arlington 5ESS end office 104. This results in a further query via a TCAP message from the Arlington 5ESS office 104 to the SCP 120 via the STP 118. The SCP returns a further TCAP message to the 5ESS, which instructs the 5ESS switch to route the call to telephone number 703-222-1111 in the Centreville 1AESS office 106 via the foreign exchange (FX) trunk 122 and distributor frame 107. At this time the Arlington switch 104 provides ring signal to the target terminal 112 in Centreville.

When the Arlington switch 104 responds to the incoming signaling message and the TCAP message and initiates its routine against the target 112 in Centreville, it performs two primary functions: It routes the call to the target telephone 112 via the Centreville office and the foreign exchange trunk 122, and it implements surveillance against the target by means of the programming of the CALEA module and software in the 5ESS switch 104, which is specified in detail in the previously referenced Telecommunications Industry Association TR45.2 Subcommittee PN-3580, Baseline Revision 10 Standard. That Standard defines the current services and interfaces for lawfully authorized electronic surveillance. It permits and prescribes delivery of specified communications and call-identifying information to a law enforcement agency subject to legal authorization. The standard defines a messaging protocol between a telecommunication service provider and a law enforcement agency. That standard is incorporated herein by reference in its entirety.

In order that the operation is completely transparent to both the calling and the called parties, it is necessary to provide special billing procedures. If the Arlington switch is LNP capable, LNP procedures will handle billing properly for the purposes of the invention. If the Arlington switch is not LNP capable the following procedures may be utilized according to one embodiment of the invention. According to this feature, the SCP may include a billing rater or associated adjunct processor. In this case the SCP will send to the Arlington switch TCAP message billing instructions and information. The switch responds by sending the identified information through Automated Message Accounting (AMA) SLIP ID. AMA ID is a method for the SCP to instruct the switch on how and who to bill. In the case of this call from Alexandria to the target terminal in Centreville, billing will occur as if destination service to the target was being provided out of Centreville switch 106. However, in actuality the call bypasses the switch 106 via the Centreville distribution frame connection. Also, billing for the PSTN service extending the call to the enforcement authority at 116 will be billed to that authority.

When the CALEA functionality in the Arlington switch 104 responds to the TCAP message and initiates its routine against the target 112 in Centreville, the direct distribution frame connection is established from the target terminal through local loop 110, through the distribution frame in the Centreville office to the dedicated trunk 122, and through that trunk to the Arlington central office 104. In essence the Centreville office 106 is no longer the effective central office of the target 112. The Arlington office 104 acts in that capacity. Centreville is now simply a cross connect or a pass through.

An outgoing target call is now described. When the target goes off-hook at target premises 112, this appears as an off-hook and request for service in the Arlington central office 106. There is an off hook delay (OHD) trigger set in the Arlington central office on the target line. The off-hook thus triggers a query from the Arlington office 106 to the SCP. The call processing record (CPR) in the SCP recognizes that calls from calling number 703-222-1111 are subject to surveillance treatment, and responds to the Arlington office with a TCAP message in which the originally dialed called number is extracted from the charge number field, replaced with the target's number (703-222-1111), and placed in the called number field. The Arlington 5ESS, on receiving the TCAP message from the SCP, will perform two primary functions. First, it will route the call to the dialed number, populating the "calling number" field of its signaling message with the target's number (703-222-1111) so that any calling number display devices at the called party's telephone will display the normal telephone number of the target, thus achieving the "transparency" required by CALEA.

When the Arlington office is LNP capable the call may be treated as any other call.

In both cases, the 5ESS Arlington switch will run its CALEA service regime associated with the target line. The CALEA module responds by executing its software to provide the enforcement authority 116 with the one-way information to which their specific authorization entitles them.

This procedure in response to the off-hook delay trigger also directs the Arlington office to implement collection and reporting of information as to the start of the call, completion of the call, time, and when the call is completed. The Arlington office 104 is thus instructed to add an AMA journal or equivalent record for that call based on what the SCP, the 5ESS switch, and the CALEA storage have in their collective information for handling that call. The SCP will direct that the billing which is accomplished from the Arlington office be attributed to the Centreville office as the originating office. The Arlington office will enter this in its journal and send it to the Revenue Accounting Office (RAO). The rating and charges are based on Centreville parameters. In addition the SCP response to the off-hook delay trigger will attend to insuring that the caller ID data being sent to a called party identifies the target number 222-1111, and not the Arlington number 703-875-1111.

Because the functioning of the invention is dependent upon the operation of switching systems the operation of a typical 5ESS switch is described. The addition of a CALEA module to this switch is then discussed.

Figure 2:
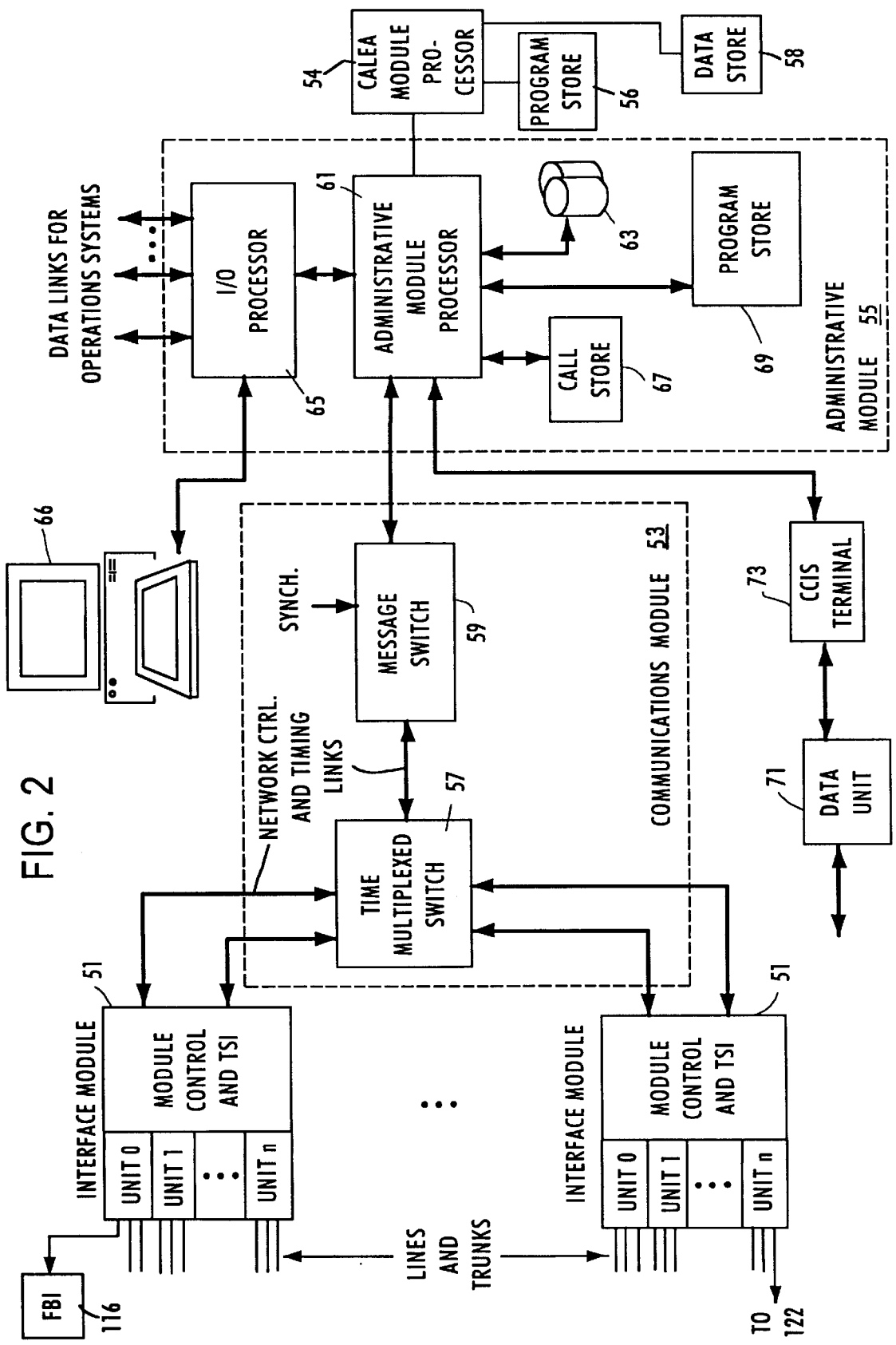
FIG. 2 shows a simplified block diagram of an electronic program controlled switch of the SSP type which has been modified pursuant to one preferred embodiment of the invention.

FIG. 2 shows a simplified block diagram of an electronic program controlled switch of the SSP type. As illustrated, the switch includes a number of different types of modules. In particular, the illustrated switch includes interface modules 51 (only two of which are shown), a communications module 53 and an administrative module 55.

The interface modules 51 each include a number of interface units 0 to n. The interface units terminate lines from subscribers' stations, trunks, T1 carrier facilities, etc. Each such termination is identified by an OE number. Where the interfaced circuit is analog, for example a subscriber loop, the interface unit will provide analog to digital conversion and digital to analog conversion. Alternatively, the lines or trunks may use digital protocols such as T1 or ISDN. Each interface module 51 also includes a digital service unit (not shown) which is used to generate call progress tones and receive and detect dialed digits in pulse code or dual-tone multi-frequency form.

In the illustrated embodiment, the unit 0 of the upper interface module 51 provides an interface for the signaling and communication links to an enforcement agency terminal 122 shown in FIG. 1. In this implementation, the links preferably consist of one or more ISDN PRI circuits each of which carries 23 bearer (B) channels for communication traffic (content traffic) and one data (D) channel for signaling data. The connection may be referred to as a half tap because it is unidirectional. The enforcement authority, such as the FBI receives the authorized data and content but is isolated from the target. This is also essential in order that the surveillance be maintained transparent to both the target and any calling party in contact with the target.

Each interface module 51 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 57 and thence to another interface module (intermodule call connection).

The communication module 53 includes the time-multiplexed switch 57 and a message switch 59. The time multiplexed switch 57 provides time division transfer of digital voice data packets between voice channels of the interface modules 51 and transfers signaling data messages between the interface modules. The switch 57, together with the TSIs of the interface modules, form the overall switch fabric for selectively connecting the interface units in call connections.

The message switch 59 interfaces the administrative module 55 to the time multiplexed switch 57, so as to provide a route through the time multiplexed switch permitting two-way transfer of control related messages between the interface modules 51 and the administrative module 55 and the CALEA module processor 54 and its program store 56 and data store 58. In addition, the message switch 59 terminates special data links, for example a link for receiving a synchronization carrier used to maintain digital synchronism.

The administrative module 55 and its adjunct CALEA module 54 provide high level control of all call processing operations of the switch. The administrative module 55 includes an administrative module processor 61, which is a computer equipped with disc storage 63, for overall control of central office (CO) operations. Likewise the CALEA processor is a computer equipped with a disk storage 56 which contains one or more CALEA programs or applications which are run to effect control of the associated switching system to implement CALEA operations and functions. These are specified in detail in the above-mentioned PS or PN 3580 which is incorporated by reference herein in its entirety.

The CALEA data store serves as a database of tables and data reflecting the treatment to be accorded telephone or other subscriber terminals authorized for surveillance in accord with the limits of the authorization which is applicable. The data store 58 also serves as a repository of the information derived from signaling messages by the processor 54. As such the data store may contain the filtered results from all of the signaling messages relating to each individual call, to and from an identified telephone number or line. The CALEA processor or site processor forms a call detail record (CDR) for each call attempt relating to an identified target under surveillance. In the case where a number of CALEA modules are involved and associated with different switches the various site processors may upload CDRs to a central file server (not shown) for parsing, sorting and further processing. The server may supply composite data regarding calls to and from targets under surveillance through a data network connection to one or more law enforcement agencies.

The administrative module processor 61 communicates with the interface modules 51 through the communication module 55. The administrative module 55 may include one or more input/output processors (not shown) providing interfaces to terminal devices for technicians and data links to operations systems for traffic, billing (AMA), maintenance data, etc.

A CCS terminal 73 and an associated data unit 71 provide an SS7 signaling link between the administrative module processor 61 and CALEA module processor 54 and one of the signal transfer points (STPs) in the Advanced Intelligent Network (AIN). Although only one such link is shown, preferably there are a plurality of such links providing redundant connections to both STPs of a mated pair and providing sufficient capacity to carry all necessary signaling to and from the particular end office 104. The SS7 signaling through the terminal 73, the data unit 71 and the STPs provides two-way signaling data transport for call set-up related messages to and from other offices. These call set-ups related messages typically utilize the ISDN-UP (ISDN-users part or ISUP) protocol portion of SS7. The SS7 signaling through the terminal 73, the data unit 71 and the STPs also provides two-way signaling data transport for communications between the end office 104 and database systems or the like, such as the SCP 120. The communications between the office 104 and the database systems or the like utilizes the TCAP (transactions capabilities applications part) protocol portion of SS7.

As illustrated in FIG. 2, the administrative module 55 also includes a call store 67 and a program store 69. Although shown as separate elements for convenience, these are typically implemented as memory elements within the computer serving as the administrative module processor 61. The program store 69 stores program instructions which direct operations of the computer serving as the administrative module processor 61.

For each call in progress, a register assigned within the call store 67 stores translation and user profile information retrieved from disc storage 63 together with routing information and any temporary information needed for processing the call. For example, for a residential customer initiating a call, the call store 67 would receive and store line identification and outgoing call billing information corresponding to an off-hook line initiating a call. A register in the call store is assigned and receives profile data from the disc memory both for originating subscribers on outgoing calls and for terminating subscribers on incoming calls. According to the invention the outgoing billing information and the target profile data may be modified both pursuant to signaling from the CALEA module and signaling received from the SCP.

It will be seen that these embodiments of the invention provides multiple methods for enabling authorized telephone surveillance by an enforcement authority pursuant to the CALEA requirements, despite the fact that certain end offices in the telecommunications network lack the capacity to implement the CALEA software and methodology.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. In a switched telephone network including multiple central office processor controlled switching systems serving subscriber terminals, said switching systems being connected together by trunks, a first of said switching systems being connected by a dedicated link to a second of said switching systems having different characteristics than said first switching system, said first switching system having an adjunct processor with a program store associated with said first switching system, said first switching system being connected to a first subscriber premises and also connected to a third of said switching systems, said second switching system being connected to a second subscriber premises by a link connected to said dedicated link;

a method comprising:
creating an off-hook condition on said link to said second subscriber premises, receiving dial tone at said second subscriber premises, and dialing digits seeking connection to a third subscriber premises connected to said third switching system;
signaling said first switching system and said adjunct processor that a request for services exists from said second subscriber premises;
establishing a one way connection from said first switching system to said first subscriber premises via said connection therebetween;
establishing a two way connection between said third subscriber premises and said second subscriber premises; and
monitoring at said first subscriber premises signaling associated with said establishment of said two way connection between said third subscriber premises and said second subscriber premises.

2. A method according to claim 1 wherein said monitoring is transparent to said second and third subscriber premises.

3. A method according to claim 1 wherein said monitoring is controlled at least in part by said adjunct processor.

4. A method according to claim 1 including the step of generating billing signals to create billing records for billing for said connection between said second and third subscriber premises and for said connection to said first subscriber premises to said second subscriber premises and to said first subscriber premises respectively.

5. A method according to claim 1 including the step of also monitoring the content of the communication over said connection between said second and third subscriber premises.

6. A method according to claim 1 wherein responsive to said signaling said adjunct processor runs at least one program from its program store.

7. A method according to claim 6 wherein said signaling to said adjunct processor includes common channel signaling from a control center for a common channel signaling system.

8. A method according to claim 7 wherein said control center comprises a services control point in an advanced intelligent network which comprises said common channel signaling system.

9. A method according to claim 8 wherein said signaling to said adjunct processor from said services control point comprises a message responsive to a trigger responsive to said dialing.

10. A method according to claim 9 wherein said message comprises a Transaction Capabilities Applications Part (TCAP) message and said trigger comprises an off-hook delay trigger set in said first switching system.

11. A method according to claim 10 wherein said program run by said adjunct processor is a surveillance program.

12. A method according to claim 11 wherein said monitored signaling includes information comprising the directory number dialed by said second subscriber premises, the duration of the connection, and the time thereof.

13. A method according to claim 4 wherein said step of generating billing signals to create billing records for billing for said connection between said second and third subscriber premises and for said connection to said first subscriber premises to said second subscriber premises and to said first subscriber premises respectively is initiated in response to common channel signaling from a control center for a common channel signaling system.

14. In a switched telephone network including multiple central office processor controlled switching systems serving subscriber premises, said switching systems being connected together by trunks, a first of said switching systems being connected by a dedicated link to a second of said switching systems having different characteristics than said first switching system, said first switching system having an adjunct processor with a program store associated with first switching system, said first switching system being connected to a first subscriber premises and also connected to a third of said switching systems, said second switching system being connected to a second subscriber premises by a link connected to said dedicated link, and an advanced intelligent network common channel signaling system having a services control point connected to said switching systems for control of said switched telephone network;

a method comprising:
creating an off-hook condition on said link to said second subscriber premises, receiving dial tone at said second subscriber premises from said first switching system, and dialing digits seeking connection to a third subscriber premises connected to said third switching system;
activating an off-hook delay trigger in said first switching system and initiating therefrom a message to said services control point;
sending a response message from said services control point to said first switching system and said adjunct processor that a request for services exists from said second subscriber premises and containing information for providing services in response to said request;
said adjunct processor running at least one program from its program store in response to said message from said services control point;
establishing a one way connection from said first switching system to said first subscriber premises via said connection therebetween;
establishing a two way connection between said third subscriber premises and said second subscriber premises through said first switching system; and
monitoring at said first subscriber premises signaling associated with said establishment of said two way connection between said third subscriber premises and said second subscriber premises.

15. In a switched telephone network including multiple central office processor controlled switching systems serving subscriber premises, said switching systems being connected together by trunks, a first of said switching systems being connected by a dedicated link to a second of said switching systems having different characteristics than said first switching system, said first switching system having an adjunct processor with a program store associated with first switching system, said first switching system being connected to a first subscriber premises and also connected to a third of said switching systems, said second switching system being connected to a second subscriber premises by a link connected to said dedicated link, said third switching system being connected to a third subscriber premises, and an advanced intelligent network common channel signaling system having a services control point connected to said switching systems for control of said switched telephone network;

a method comprising:
creating an off-hook condition at said third subscriber premises and dialing the directory number of said second subscribers premises using the NXX of said second switching system;
activating an off-hook delay trigger in said third switching system and initiating therefrom a message to said services control point;
sending a response message from said services control point to said third switching system directing that the request for service be directed to said first switching system;
directing the request for service to said first switching system and activating a terminating attempt trigger in said first switching system and initiating therefrom a message to said services control point;
sending a response message from said services control point to said first switching system and said adjunct processor containing information for providing services in response to said request;
said adjunct processor running at least one program from its program store in response to said message from said services control point;
establishing a one way connection from said first switching system to said first subscriber premises via said connection therebetween;
establishing a two way connection between said third subscriber premises and said second subscriber premises through said first switching system; and
monitoring at said first subscriber premises signaling associated with said establishment of said two way connection between said third subscriber premises and said second subscriber premises.

16. A method according to claim 15 including the step of generating billing signals to create billing records for billing for said connection between said second and third subscriber premises and for said connection to said first subscriber premises to said third subscriber premises and to said first subscriber premises respectively.

17. In a switched telephone network including multiple central office processor controlled switching systems serving subscriber terminals, said switching systems being connected together by trunks, a first of said switching systems being connected by a dedicated link to a second of said switching systems having different characteristics than said first switching system, said first switching system having an adjunct processor with a program store associated with first switching system, said first switching system being connected to a first subscriber premises and also connected to a third of said switching systems, said second switching system being connected to a second subscriber premises by a link connected to said dedicated link;

a method comprising:
creating an off-hook condition on said link to said second subscriber premises, receiving dial tone at said second subscriber premises, and dialing digits seeking connection to a third subscriber premises connected to said third switching system;
signaling said first switching system and said adjunct processor that a request for services exists from said second subscriber premises;
establishing a one way connection from said first switching system to said first subscriber premises via said connection therebetween;
establishing a two way connection between said third subscriber premises and said second subscriber premises;
sending from said first switching system to said third subscriber premises signaling information indicating the number of the service requesting party to be said second subscriber premises; and
monitoring at said first subscriber premises signaling associated with said establishment of said two way connection between said third subscriber premises and said second subscriber premises.

18. A method comprising:
creating an off-hook condition on a link from a first subscribers premises to a first program controlled switch in a switched telephone network and receiving dial tone at said first subscriber premises;
dialing digits seeking connection to a second subscriber premises connected to a second switching system;
signaling to a third switching system connected by trunks to said first and second switching systems, and signaling to processing means associated with said third switching system that a request for services exists from said first subscriber premises;
establishing a one way connection from said third switching system to a third subscriber premises connected thereto;
establishing a two way connection between said first subscriber premises and said second subscriber premises through said third switching system; and
monitoring at said first subscriber premises signaling associated with said establishment of said two way connection between said first subscriber premises and said second subscriber premises.

19. A method according to claim 18 wherein the portion of the connection between said first subscriber premises and said second subscriber premises between said first switching system and said third system comprises a dedicated link.

20. A method according to claim 19 wherein said dedicated link is connected to said link to said first subscribers premises to by-pass said first switching system.

21. A switched telephone network comprising:
a first switching system including a program controlled switch having a first distribution frame;
a first subscribers premises having a directory number and connected by a link to said first distribution frame;
a second switching system including a program controlled switch having a second distribution frame;
said first switching system connected to said second program controlled switch by a trunk;
said first and second distribution frames connected by a dedicated link;
said first subscribers premises connected to said dedicated link at said first distribution frame and having a line appearance at said second distribution frame with a different number;
a second subscribers premises connected by a link to said second distribution frame;
a common channel signaling system having a controller for controlling the operation of said program controlled switches;
an adjunct processor associated with said second switching system and with said controller;
said adjunct processor in conjunction with said controller and said second switching system establishing a one-way connection of said link to said second subscriber premises to a connection established through said second switching system connecting said first subscriber premises and a third subscriber premises.

22. A network according to claim 21 wherein an off-hook delay trigger is set against said first subscriber premises and causes an inquiry message to said central controller upon said first subscriber premises going off-hook and dialing digits seeking a connection to said third subscribers premises, said central controller responding to said inquiry message by sending to said second switching system and said adjunct processor a response message including directions to initiate running of a program by said adjunct processor and to connect said second subscriber premises to monitor signals associated with a connection established responsive to said first subscriber premises dialing said digits.

23. A switched telephone network comprising:
a first switching system including a program controlled switch having a first distribution frame;
a first subscribers premises having a directory number and connected by a link to said first distribution frame;
a second switching system including a program controlled switch having a second distribution frame;
said first switching system connected to said second switching system by a trunk;
said first and second distribution frames connected by a dedicated link;
said first subscribers premises connected to said dedicated link at said first distribution frame and having a line appearance at said second distribution frame with a different number;
a second subscribers premises connected by a link to said second distribution frame;

a third switching system including a program controlled switch;

a third subscribers premises connected by a link to said third switching system;

said third switching system connected by trunk to said second switching system;

a common channel signaling system having a controller for controlling the operation of said program controlled switches;

an adjunct processor associated with said second switching system and with said controller;

said adjunct processor in conjunction with said controller and said second switching system establishing a one-way connection of said link to said second subscriber premises to a connection established through said second switching system connecting said first subscriber premises and said third subscriber premises responsive to said third subscriber premises dialing said directory number.

24. A network according to claim 23 wherein at least said second and third switching systems have an off-hook delay trigger set therein against said directory number.

25. A network according to claim 23 wherein said second switching system has a terminating attempt trigger set therein.

26. A network according to claim 25 wherein dialing of said directory number at said third subscriber premises to initiate a call to said first subscriber premises activates said off-hook delay trigger in said third switching system and causes said third switching system to send an inquiry message to said central controller, said central controller sending a response message directing that said call be sent to said second switching system with said different number.

27. A network according to claim 26 wherein said call is sent to said second switching system and activates a terminating attempt trigger causing said second switching system to send an inquiry message to said central controller, said central controller sending a response message directing that said adjunct processor run at least one program and that said one-way connection to said second subscriber premises to said connection established through said second switching system connecting said first subscriber premises and said third subscriber premises be completed.

28. In a switched telephone network including multiple central office processor controlled switching systems serving subscriber premises, said switching systems being connected together by trunks, a first of said switching systems being connected by a dedicated link to a second of said switching systems having different characteristics than said first switching system, said first switching system having an adjunct processor with a program store associated with said first switching system, said first switching system being connected to a first subscriber premises and also connected to a third of said switching systems, said second switching system being connected to a second subscriber premises by a link connected to said dedicated link, said third switching system being connected to a third subscriber premises, and an advanced intelligent network common channel signaling system having a services control point connected to said switching systems for control of said switched telephone network;

a method comprising:

creating an off-hook condition at said third subscriber premises and dialing the directory number of said second subscribers premises using the NXX of said second switching system;

activating an off-hook delay trigger in said third switching system and initiating therefrom a message to said services control point;

sending a response message from said services control point to said third switching system directing that the request for service be directed to said first switching system;

directing the request for service to said first switching system and activating a terminating attempt trigger in said first switching system and initiating therefrom a message to said services control point;

sending a response message from said services control point to said first switching system and said adjunct processor containing information for providing services in response to said request;

said adjunct processor running at least one program from its program store in response to said message from said services control point;

establishing a one way connection from said first switching system to said first subscriber premises via said connection therebetween;

establishing a two way connection between said third subscriber premises and said second subscriber premises through said first switching system; and monitoring at said first subscriber premises signaling associated with said establishment of said two way connection between said third subscriber premises and said second subscriber premises.

29. In a switched telephone network having multiple switching systems connected together by trunks and serving subscriber terminals connected to such switching systems by links, with a common channel signaling system having a central controller controlling the operation of said network;

a method comprising;

a first of said subscriber terminals linked to a first of said switching systems dialing the directory number of a second of said subscriber terminals linked to a second of said switching systems seeking to complete a call thereto;

said second of said switching systems responsive to a trigger set therein sending a query message to said central controller;

said central controller sending a response message to second switching system directing connection of said call to another number for a third subscriber terminal at a third of said switching systems, said third of said switching systems having an adjunct processor associated therewith;

switching said call back to said second switching system through said third switching system using said another number and initiating a program at said adjunct processor;

completing said call to said second subscriber terminal through said second switching system; pursuant at least in part to said adjunct processor program, connecting said third subscriber terminal to the completed call via a one way connection; and monitoring at said third subscriber terminal at least signaling information related to said call.

30. A method according to claim 29 wherein said monitoring includes monitoring of the content of said completed call.

31. A method according to claim 29 wherein said monitoring includes recording the calling directory number, time of completion of said call, time of termination of said call, and information with respect to at least a part of the signaling which resulted in set-up and tear-down of said call.

32. A method according to claim 29 including the step of initiating billing procedures for said call at least in part pursuant to said program of said adjunct processor.

33. In a switched telephone network having multiple switching systems connected together by trunks and serving subscriber terminals connected to such switching systems by links, with a common channel signaling system having a central controller controlling the operation of said network;

a method comprising;

a first of said subscriber terminals linked to a first of said switching systems dialing the directory number of a second of said subscriber terminals linked to a second of said switching systems seeking to complete a call thereto;

said second of said switching systems responsive to a trigger set therein sending a query message to said central controller;

said central controller sending a response message to said first switching system directing said first switching system to regenerate said call to another number for a third subscriber terminal at a third of said switching systems, said third of said switching systems having an adjunct processor associated therewith;

completing said call from said first switching system through third switching system to said second switching system and to said second subscriber terminal using said another number and initiating a program at said adjunct processor;

completing said call to said second subscriber terminal through said second switching system; pursuant at least in part to said adjunct processor program, connecting said third subscriber terminal to the completed call via a one way connection; and monitoring at said third subscriber terminal at least signaling information related to said call.

34. A method according to claim 33 wherein said monitoring includes monitoring of the content of said completed call.

35. A method according to claim 33 wherein said monitoring includes recording the calling directory number, time of completion of said call, time of termination of said call, and information with respect to at least a part of the signaling which resulted in set-up and tear-down of said call.

36. A method according to claim 23 including the step of initiating billing procedures for said call at least in part pursuant to said program of said adjunct processor.

* * * * *